US012128584B2

(12) United States Patent
Na et al.

(10) Patent No.: US 12,128,584 B2
(45) Date of Patent: Oct. 29, 2024

(54) PRINTED OBJECT SURFACE FLATTENING-TYPE 3D PRINTER FOR CONSTRUCTION

(71) Applicant: SAMSUNG E&A CO., LTD., Seoul (KR)

(72) Inventors: Ho Sung Na, Hanam-si (KR); Dong Hyun Kim, Seoul (KR); Kwan Seon Hong, Seoul (KR); Hye Jin Ryu, Hanam-si (KR)

(73) Assignee: SAMSUNG E&A CO., LTD., Seoul (KR)

( * ) Notice: Subject to any disclaimer, the term of this patent is extended or adjusted under 35 U.S.C. 154(b) by 0 days.

(21) Appl. No.: 18/265,365

(22) PCT Filed: Jan. 5, 2022

(86) PCT No.: PCT/KR2022/000191
§ 371 (c)(1),
(2) Date: Jun. 5, 2023

(87) PCT Pub. No.: WO2022/149859
PCT Pub. Date: Jul. 14, 2022

(65) Prior Publication Data
US 2023/0390959 A1     Dec. 7, 2023

(30) Foreign Application Priority Data
Jan. 7, 2021    (KR) ........................ 10-2021-0001790

(51) Int. Cl.
*B28B 11/08*     (2006.01)
*B28B 1/00*     (2006.01)
(Continued)

(52) U.S. Cl.
CPC .......... *B28B 11/0845* (2013.01); *B28B 1/001* (2013.01); *B33Y 30/00* (2014.12); *B33Y 40/20* (2020.01)

(58) Field of Classification Search
CPC ..... B28B 11/0845; B28B 1/001; B33Y 10/00; B33Y 30/00; B33Y 40/20; B29C 64/214; B29C 64/218; B29C 64/205; B29C 64/30
See application file for complete search history.

(56) References Cited

U.S. PATENT DOCUMENTS

2017/0028633 A1    2/2017   Evans et al.
2019/0061061 A1    2/2019   Fischer et al.

FOREIGN PATENT DOCUMENTS

CN         106985258 A      7/2017
CN         107081839 A      8/2017
(Continued)

OTHER PUBLICATIONS

Notice of Allowance, dated Nov. 2, 2021, issued in corresponding KR Application No. 10-2021-0001790, 1 pg.
(Continued)

*Primary Examiner* — Jamel M Nelson
(74) *Attorney, Agent, or Firm* — Panitch Schwarze Belisario & Nadel LLP

(57) ABSTRACT

The present invention relates to a 3D printer for construction for printing and forming various structures wherein a roller 50 follows a nozzle 10 which discharges concrete, mortar, or the like, to bring an outer peripheral surface of the roller 50 to be in close contact with a surface of the printed object, and thus the surface of the printed object is flattened.

According to the present invention, a high-degree surface flattening work can be performed on the surface of a printed object simultaneously as the printed object is printed by a 3D
(Continued)

printer for construction, thus enabling rapid and reliable flattening of the printed object and smooth surface forming.

4 Claims, 13 Drawing Sheets

(51) Int. Cl.
*B33Y 30/00* (2015.01)
*B33Y 40/20* (2020.01)

(56) References Cited

FOREIGN PATENT DOCUMENTS

| | | | | | |
|---|---|---|---|---|---|
| CN | 108247056 | A | * | 7/2018 | ............ B22F 10/00 |
| CN | 108247056 | A | | 7/2018 | |
| CN | 108340469 | A | | 7/2018 | |
| CN | 208644074 | U | | 3/2019 | |
| CN | 109604099 | A | | 4/2019 | |
| CN | 111456438 | A | | 7/2020 | |
| CN | 211709580 | U | | 10/2020 | |
| JP | H0729331 | B2 | | 4/1995 | |
| JP | 2018130863 | A | | 8/2018 | |
| KR | 100837109 | B1 | | 6/2008 | |
| KR | 20160080894 | A | | 7/2016 | |
| KR | 20170062689 | A | | 6/2017 | |
| KR | 101769144 | B1 | | 8/2017 | |
| KR | 20180016100 | A | | 2/2018 | |
| KR | 101895151 | B1 | | 9/2018 | |
| KR | 20190022080 | A | | 3/2019 | |
| KR | 101974398 | B1 | | 5/2019 | |
| KR | 20190065622 | A | | 6/2019 | |
| KR | 20200053973 | A | | 5/2020 | |
| KR | 102331858 | B1 | | 12/2021 | |
| KR | 102396630 | B1 | | 5/2022 | |

OTHER PUBLICATIONS

Notice of Non-Final Rejection, dated May 12, 2021, issued in corresponding KR Application No. 10-2021-0001790, 5 pgs.
Notice of Non-Final Rejection, dated Sep. 23, 2021, issued in Korean Application No. 10-2021-0081202, 4 pgs.
Notice of Allowance, dated Apr. 8, 2022, issued in Korean Application No. 10-2021-00081202, 1 pg.
International Search Report and Written Opinion, dated Apr. 18, 2022, issued in PCT/KR2022/000191 (WO2022/149859 published Jul. 14, 2022), 6 pgs.
The First Office Action, dated Dec. 15, 2023, issued in Chinese Application No. 202280007904.X, 15 pages (including English-language translation).

* cited by examiner

PRINTED OBJECT SURFACE FLATTENING-TYPE 3D PRINTER FOR CONSTRUCTION

TECHNICAL FIELD

The present invention relates to a 3D printer for construction for printing and forming various structures wherein as a roller 50 follows a nozzle 10 discharging concrete, mortar, or the like, an outer peripheral surface of the roller 50 is in contact with the surface of a printed object, thereby rolling the surface of the printed object.

BACKGROUND ART

A 3D printer for construction is an apparatus for building a structure of a predetermined shape by linearly extruding and stacking a fluid material such as concrete or mortar, and as such, can omit or minimize the mold construction process necessarily required in the conventional construction of concrete structures and may have a significant advantage in terms of formability, construction time, etc. and Korean Patent NO. 1895151 may be cited as a related prior art.

In addition to Korean Patent NO. 1895151, in a conventional 3D printer for construction as shown in FIG. 1, a fluid material such as concrete or mortar is linearly extruded via a nozzle 10 mounted on a movable body 20, and a structure is formed as the extruded linear printed object is stacked and cured, and printing of a wall body is illustrated in FIG. 1 by way of example.

An object printed by a 3D printer for construction as described above basically has a form of a linear extrudate, and a planned structure is formed as a linear extrudate is stacked along the moving path of a movable body 20 and a nozzle 10. Although the 3D printer illustrated in FIG. 1 is configured such that the nozzle 10 for discharging a printed object is mounted on the movable body 20, wherein the movable body 20 is configured to make a horizontal reciprocating motion along a rail 92 liftably mounted on a gantry crane-type frame 90, other various schemes other than the aforementioned configuration that allow free movement of the movable body 20 mounted with the nozzle 10, e.g., a jib crane, may be applied.

DISCLOSURE

Technical Problem

As described above, the product printed by a 3D printer for construction basically is a stacked body of linear extrudates and therefore, formation of boundaries between the printed layers is inevitable.

That is, as shown in FIG. 1, in a stacked body constituting a printed object, formation of a discontinuous surface between printed layers, each having a different elevation, is inevitable and gives rise to irregularities on the surface of the printed object, and as a result, severe issues in terms of outer appearance as well as the bonding strength between the printed layers and structural stability may arise.

In this regard, in the prior art, once printing of a basic structure is complete, a post-treatment operation such as a surface treatment or plastering is performed, wherein the surface treatment forms a separate coating layer on the surface of the printed object. However, since they can only be performed entirely by manpower, such post-treatment processes inevitably become factors contributing to a prolonged construction time and increased construction costs.

Technical Solution

To address the aforementioned issues, the present invention provides a 3D printer for construction and in particular, a printed object surface-flattening type 3D printer for construction wherein a roller 50 mounted on a movable body 20 and configured to follow a nozzle 10 discharging a fluid material is installed, wherein the roller 50 moves along with movement of the movable body 20 and the nozzle 10, and an outer circumferential surface of the roller 50 is in contact with a surface of a printed object extruded from the nozzle 10 to thereby flatten the surface of the printed object.

In addition, the printed object surface-flattening type 3D printer for construction is characterized in that a rotatable body 30 is installed on the movable body 20, the rotatable body 30 having an axis of rotation parallel to a discharge direction of the nozzle 10, wherein a support shaft 40 of the roller 50 is connected to the rotatable body 30 such that as the rotatable body 30 rotates, the support shaft 40 and the roller 50 move along a circular arch centered on the axis of rotation.

In addition, the printed object surface-treatment type 3D printer for construction is characterized in that a planar rotatable plate 70 is connected to the rotatable body 30, the support shaft 40 of the roller 50 being connected to one end of the rotatable plate 70, wherein the inside of the rotatable plate 70 is hinged to the rotatable body 30 and the other end of the rotatable plate 70 is connected to the rotatable body 30 via an elastic body 73, such that as the elastic body 73 is stretched or contracted, the rotatable plate 70 rotates in a plane.

In addition, the printed object surface-treatment type 3D printer for construction is characterized in that a planar rotatable plate 70 is connected to the rotatable body 30, a spray pipe 60 is connected to one end of the rotatable plate 70, wherein the inside of the rotatable plate 70 is hinged to the rotatable body 30 and the other end of the rotatable plate 70 is connected to the rotatable body 30 via an elastic body 73, such that as the elastic body 73 is stretched or contracted, the rotatable plate 70 rotates on a plane, and a spray hole 61 is formed in the spray pipe 60, the spray hole 61 facing a printed object to thereby spray a liquid material to the surface of the printed object.

In addition, the printed object surface-flattening type 3D printer for construction is characterized in that a driving part 45 rotating a driving wheel 47 is mounted on the support shaft 40, and a driven wheel 57 being in contact with the driving wheel 47 is mounted on the roller 50, such that as the driving part 45 rotates, the driven wheel 57 and the roller 50 rotate.

In addition, the printed object surface-flattening type 3D printer for construction is characterized in that an annular rack 35 is mounted on the rotatable body 30, a planar center of the annular rack 35 coinciding with the axis of rotation of the rotatable body 30, and a pinion 25 is installed on the movable body 20, the pinion 25 being connected to a driving motor 23 and engaged with the rack 35, such that as the pinion 25 rotates, the rack 35 and the rotatable body 30 rotate.

Advantageous Effects

According to the present invention, a high-degree surface flattening work can be performed on the surface of a printed object simultaneously as the printed object is printed by a 3D printer for construction, thus enabling rapid and reliable flattening of the printed object and smooth surface forming.

In particular, issues considered inevitable of a conventional 3D printer for construction, e.g., formation of surface irregularities and structurally weak portions due to a discontinuous surface between printed layers, may be dramatically mitigated and inhibited and as a result, an improvement in the outer appearance as well as structural performance of the finished structure may be achieved.

In addition, since coating and plastering operations performed following the printing of a structure by a 3D printer for construction in the prior art can be omitted, the overall process may be simplified, construction time may be shortened, and construction costs may be reduced.

MODE FOR INVENTION

The configuration and mechanism of the present invention will be described in detail with reference to the accompanied drawings below.

Figure 1:
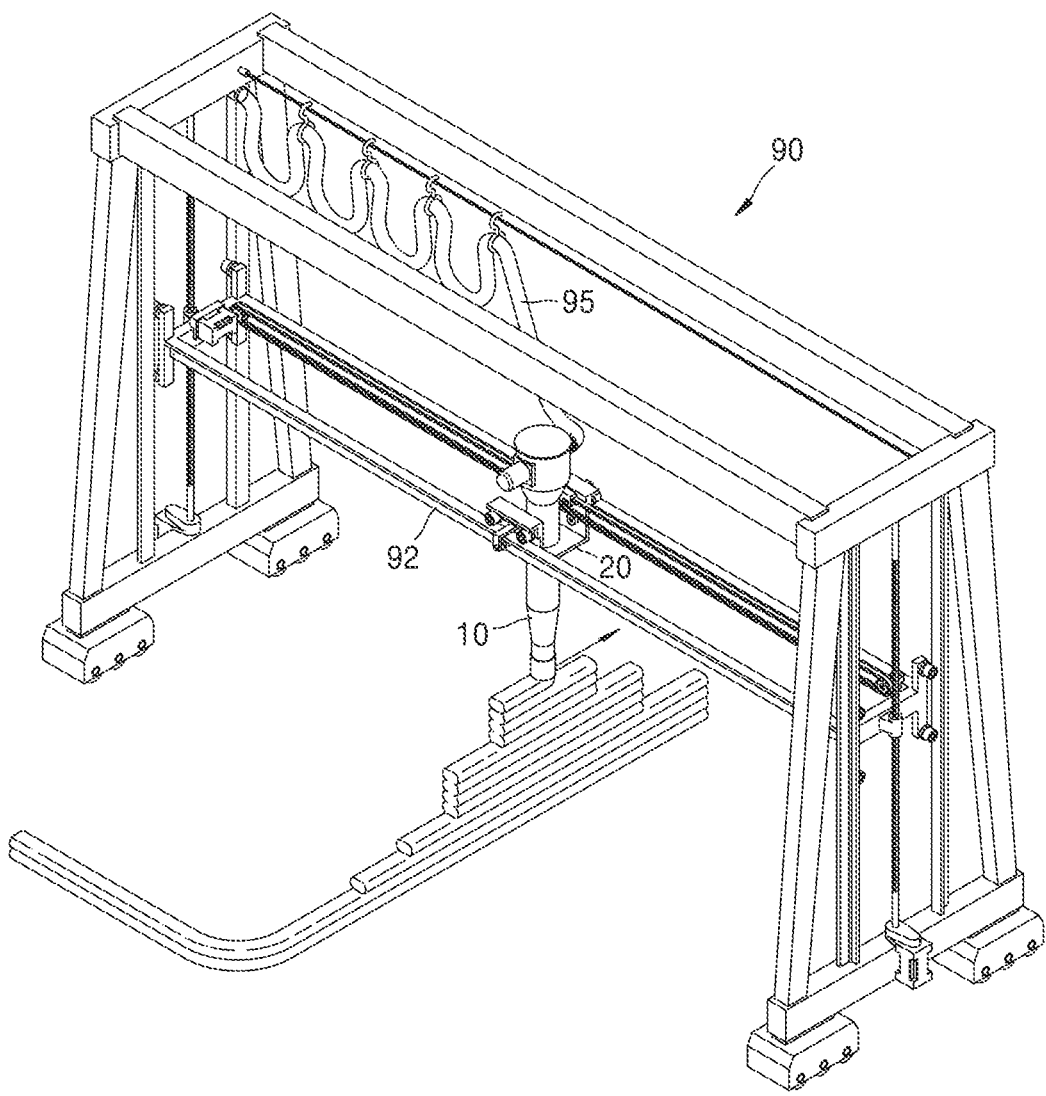
FIG. 1 illustrates an example of a 3D printer for construction in the prior art.
Figure 2:
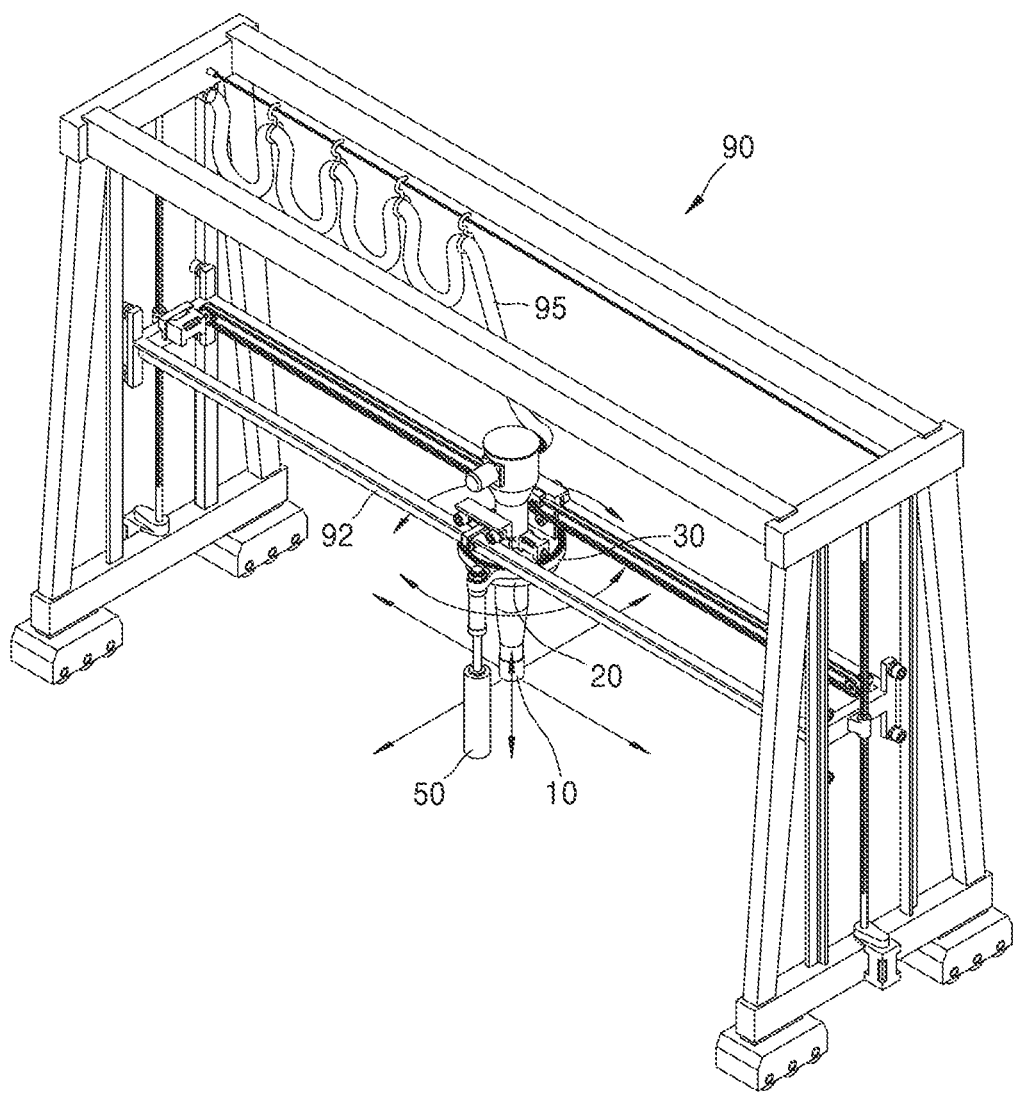
FIG. 2 is a perspective view of an embodiment of the present invention.

First of all, FIG. 2 illustrates an overall configuration of a 3D printer for construction to which an embodiment of the present invention is applied. In particular, the illustrated embodiment shows that an elevating type rail 92 is configured on a gantry crane-type frame 90, and a lateral reciprocating motion of a movable body 20 along this rail 92 gives a motion to the movable body 20 and the nozzle 10.

In particular, the self-propelled gantry crane-type frame 90 may be applied as a basic framework of the 3D printer, wherein forward and backward motions of the self-propelled frame 90 in a longitudinal direction give a forward F motion or a backward B motion to the movable body 20 mounted with the nozzle 10, vertical movement of the movable body 20 is carried out by the rail 92 liftable mounted on the frame 90, and as the movable body 20 travels along the rail 92 in a lateral direction, left L movement or right R movement of the nozzle 10 is carried out.

Figure 3:
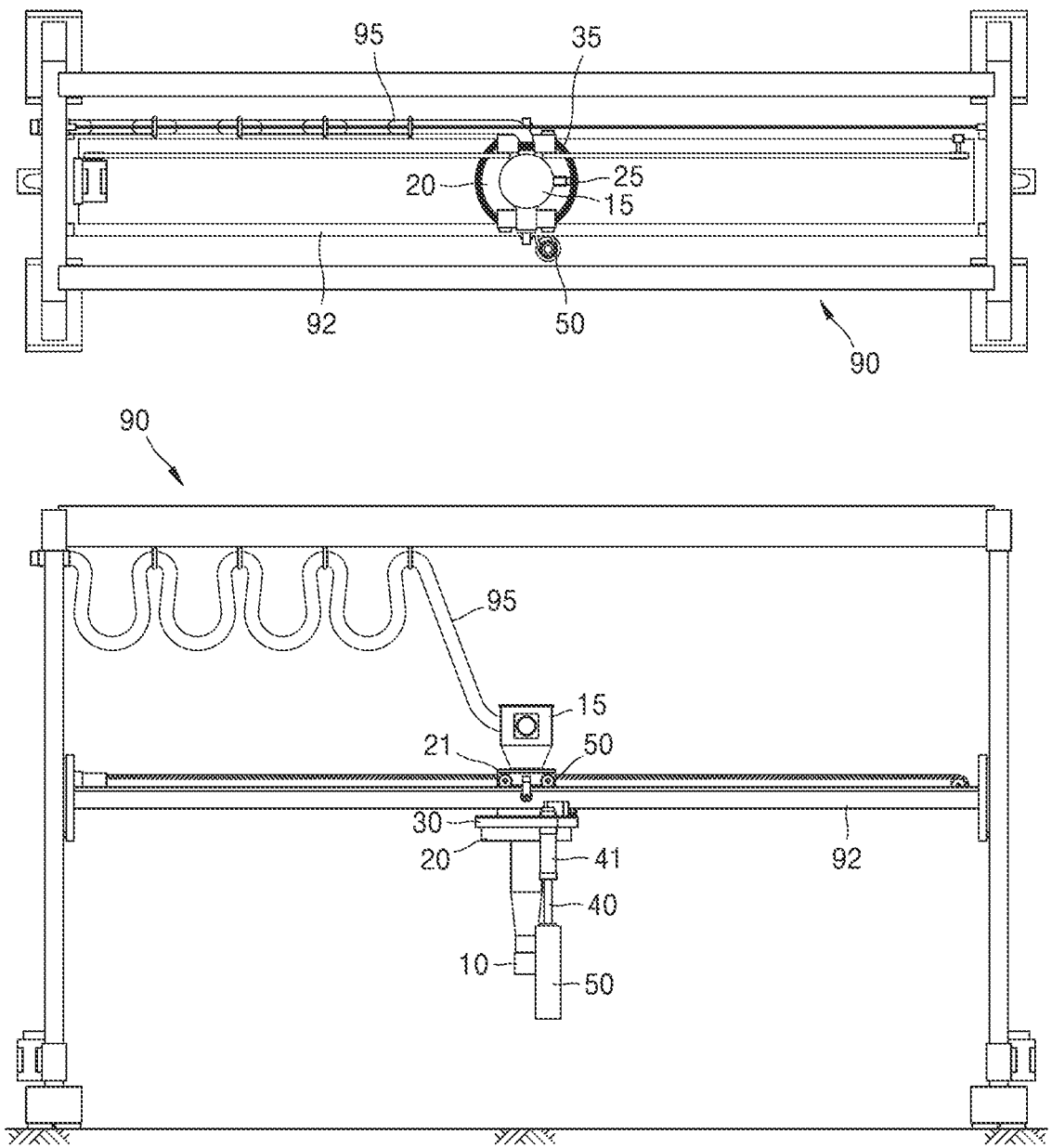
FIG. 3 is a front view and plan view of the embodiment of FIG. 2.
Figure 4:
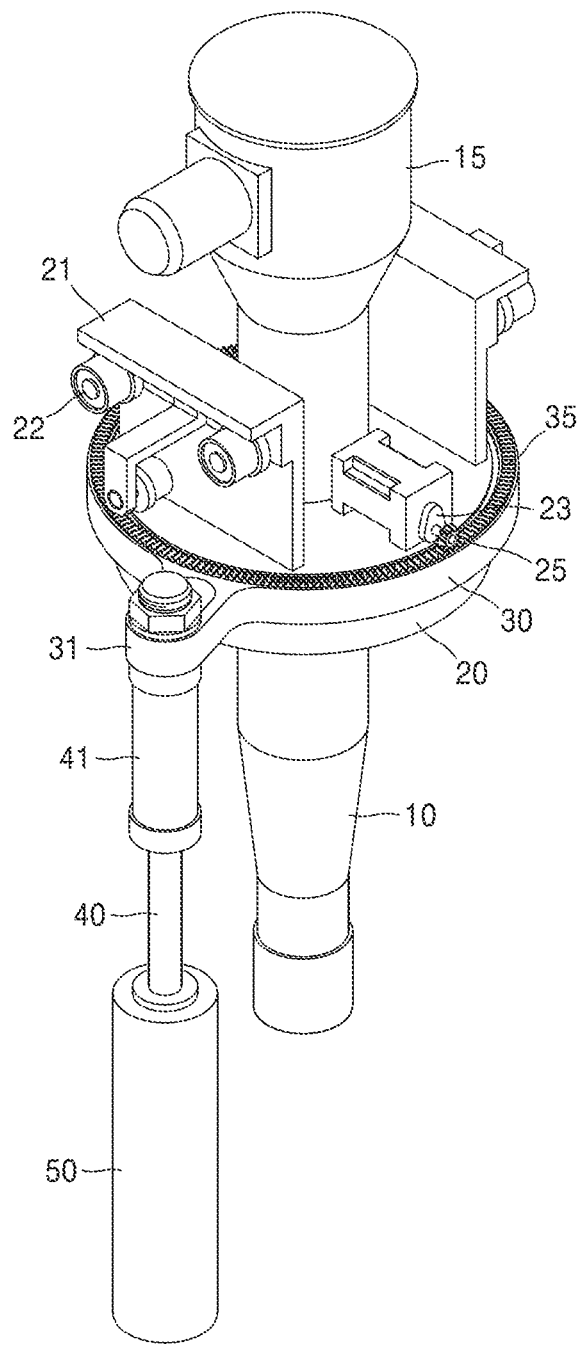
FIG. 4 is a perspective view of a main part of the embodiment of FIG. 2.

As shown in FIG. 3 and FIG. 4, a bracket 21 mounted with a plurality of driving wheels 22 may be joined to the movable body 20 mounted with the nozzle 10, and traveling of the driving wheels 22 along the rail 92 gives a reciprocating motion to the bracket 21 and the movable body 20 in a direction parallel to the rail 92. Although the illustrated embodiment shows that the movable body 20 is driven by a belt connected to the bracket 21, a separate power source other than a belt may be connected to the driving wheels 22 of the movable body 20 to make self-propelled driving possible.

In particular, the nozzle 10 mounted on the movable body 20 may be configured to discharge below the movable body 20 a fluid material e.g., concrete and mortar so as to allow a linear extrudate forming each printed layer to be stacked along a moving path of the movable body 20 to thereby form a desired structure. As shown in FIGS. 2 to 4, a hopper 15 in which a fluid material can be temporarily held may be configured above the nozzle 10 and a supply pipe 95 may be connected to the hopper 15 to continuously supply the fluid material to the nozzle 10.

As such, movement of the movable body 20 is carried out by the self-propelled frame 90 and the rail 92 in the embodiments illustrated in the drawings; however, if the movable body 20 mounted with the nozzle 10 is allowed to move freely in vertical and lateral directions, various types such as a jib crane, may be applied as a main body of the 3D printer for construction of the present invention.

As shown in FIG. 4 illustrating main components of the present invention, the 3D printer for construction of the present invention includes a roller 50 mounted on a movable body 20 and following the nozzle 10 to discharge a fluid material wherein the roller 50 moves along with movement of the movable body 20 and the nozzle 10. In particular, as illustrated on the right side in FIG. 5, the surface of a printed object extruded from the nozzle 10 may be flattened by having the outer circumferential surface of the roller 50 be in contact with the surface of the printed object.

That is, the cylindrical roller 50 is installed in an upright state, parallel to the discharge direction of the fluid material of the nozzle 10, such that as the outer circumferential surface of the roller 50 compresses the surface of a printed object formed by stacking of linear extrudates discharged from the nozzle 10, surface irregularities resulting from a discontinuous surface formed between the printed layers may be flattened and the tissues of the surface portion of the printed object may be densified.

Figure 5:
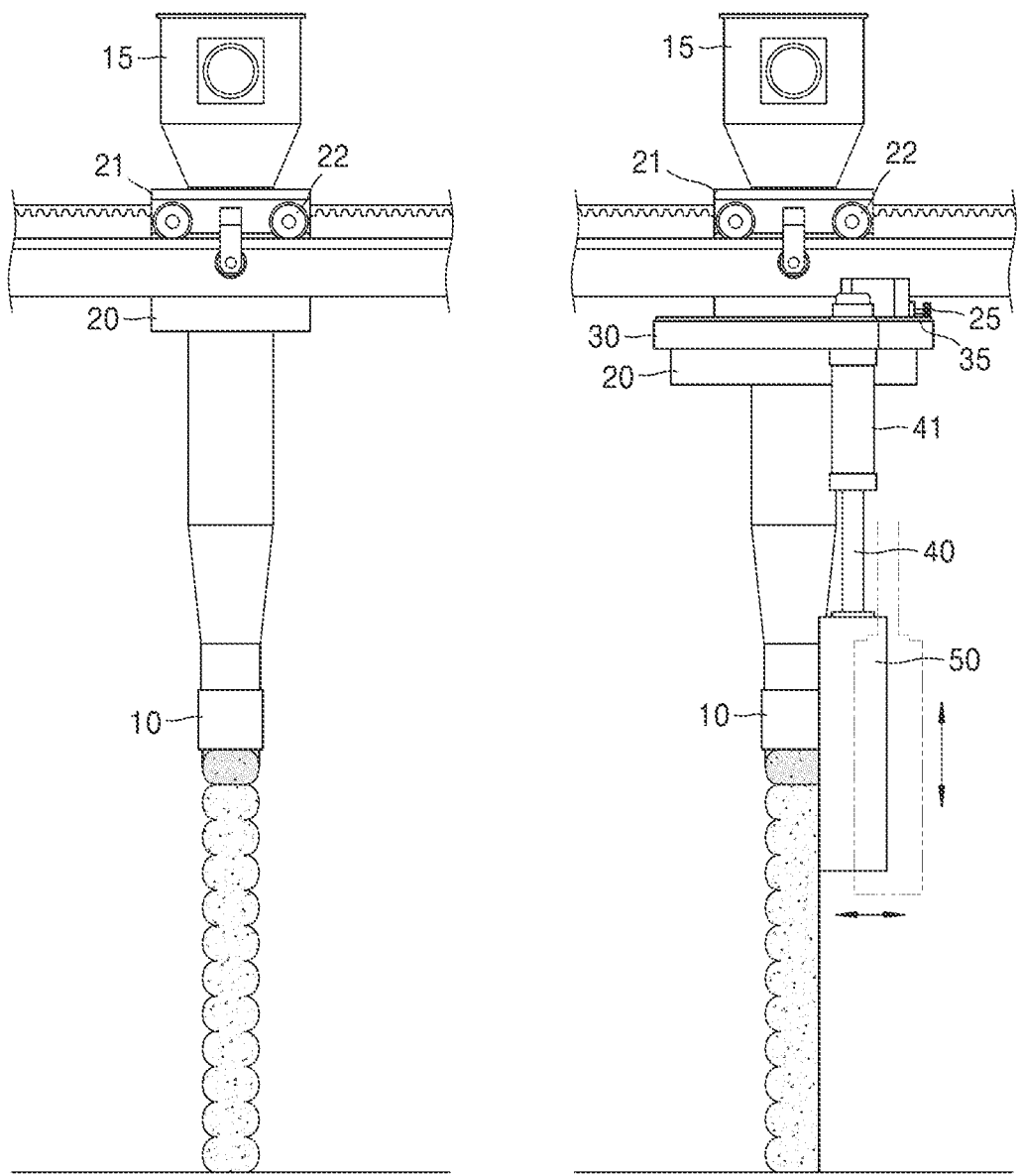
FIG. 5 is a diagram for comparing operating methods between a prior art and the present invention.

As can be seen in FIG. 5, which comparatively shows a printed object printed by the present invention and a printed object printed by a prior art, the prior art illustrated on the left side of the drawing has a discontinuous surface between printed layers and severe surface irregularities resulting therefrom, and a decrease in effective cross-sectional area and formation of structurally weak portions resulting therefrom, whereas the present invention illustrated on the right side of the drawing shows flattened surface irregularities as well as tissue densification on the same site by compression, thus ensuring both improved outer appearance and structural stability.

As illustrated in FIG. 4 and on the right side of FIG. 5, in the present invention, the roller 50 is connected to the movable body 20 via components such as a support shaft 40, an elevating body 41, and a rotatable body 30, and here, the support shaft 40 is an axis coaxial with the central axis of the roller 50 on a plane and as such, simultaneously functions as an axis of rotation of the roller 50 and the support rod of the roller 50. In particular, as the roller 50 is lifted or lowered along with the support shaft 40 being lifted or lowered by the elevating body 41 connected to an upper end of the support shaft 40, the range of contact between the roller 50 and the printed object may be adjusted.

Examples of the elevating body 41 may include a fluid pressure cylinder such as a hydraulic cylinder and a pneumatic cylinder, and an axial moving device or telescopic device, such as a linear actuator. Since the contact area between the printed object and the roller 50 is adjusted by driving the elevating body 41, the range of surface-flattening may be flexibly adjusted depending on the state of stacking or material characteristics of the printed object.

Figure 6:
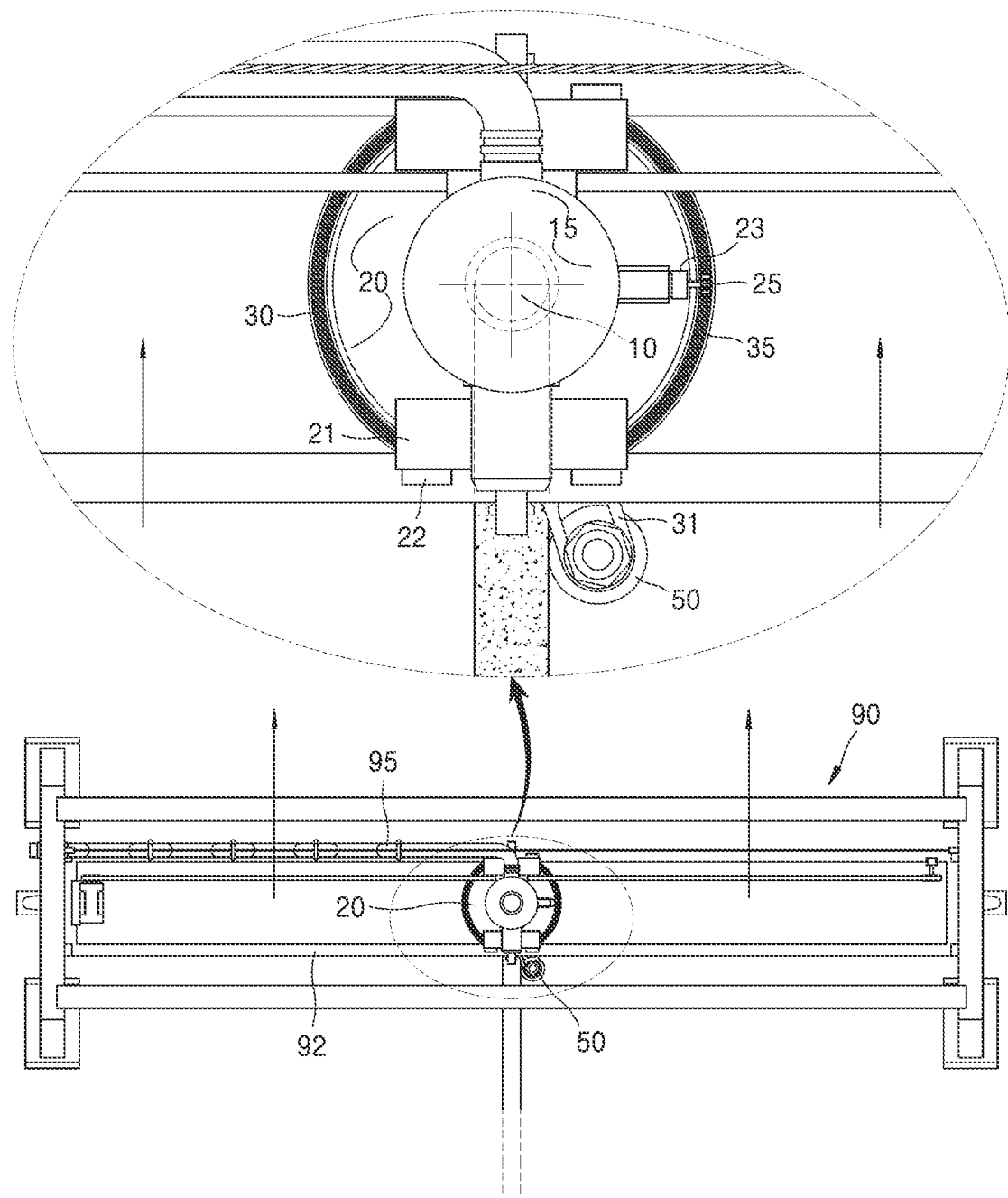
FIG. 6 is a plan view of an operating state of the embodiment of FIG. 2.

In addition, as shown in FIG. 4 and FIG. 6 in the present invention, the roller 50 is configured to be able to follow the movement of the nozzle 10 and at the same time, to be able to rotate on a plane as needed, wherein this configuration may be achieved through the configuration in which a rotatable body 30 having an axis of rotation parallel to a discharge direction of the nozzle 10 is mounted on the movable body 20 and a support shaft 40 of the roller 50 is connected to the rotatable body 30. As a result, as the rotatable body 30 rotates, the support shaft 40 and the roller 50 may move along a circular arc centered on the rotation shaft.

In the illustrated embodiment, mounting of the roller 50 on the rotatable body 30 has a structure in which an upper end of the elevating body 41 described above is mounted on a peripheral portion of the rotatable body 30 and the support shaft 40 is connected to a lower end of the elevating body 41, wherein an upper end of the roller 50 is connected to the support shaft 40.

In addition, as shown in the illustrated embodiment, a protruded plate 31 protruding outwardly from the periphery of the rotatable body 30 may be utilized as an installation site for the roller 50 on the rotatable body 30. In particular, as shown in FIG. 4 and FIG. 6, in mounting the roller 50 on the protruded plate 31 of the rotatable body 30, an elongated hole may be created in the protruded plate 31 and, a roller 50—connecting component, e.g., the elevating body 41, may be mounted in this elongated hole, such that by adjusting a mounting position of the roller 50—connecting component in the elongated hole, the connecting point of the roller 50 on a plane, that is, the planar distance between the center point of the roller 50 and the center point of the nozzle 10 may be controlled.

As described above, by controlling the distance between the center point of the roller 50 and the center point of the nozzle 10, a flexible adjustment may be made to the compression position of the roller 50 even when the planar width of the printed object varies due to a change in the diameter of discharge holes or a change in the discharge speed of the nozzle 10.

The planar rotation and arc movement of the rotatable body 30 with respect to the movable body 20 of the 3D printer for construction of the present invention may be realized as illustrated in FIG. 4 through a specific configuration in which an annular rack 35 is mounted on the rotatable body 30, a planar center of the annular rack 35 coinciding with the axis of rotation of the rotatable body 30, and a pinion 25 is installed on the movable body 20, the pinion 25 being connected to a driving motor 23 and engaged with the rack 35, such that as the pinion 25 rotates, the rack 35 and the rotatable body 30 rotate.

Here, the mutually rotatable connection of the movable body 20 and the rotatable body 30 as shown in FIG. 4 and FIG. 6 is preferably configured to have an axis of rotation that coincides with the planar center point of the nozzle 10. To this end, as shown in the same drawings, it is preferable that the main body of the movable body 20 is configured in the form of a cylinder or a disc having the nozzle 10 mounted in the center thereof, and the rotatable body 30 is configured in an annular body, such that the movable body 20 and the rotatable body 30 are joined concentrically on a plane. Although not illustrated in the drawings, a bearing or a lubricating means may be configured between the outer circumferential surface of the movable body 20 and the inner circumferential surface of the rotatable body 30 to facilitate the rotation of the rotatable body 30.

Consequently, the present invention may be regarded as having a structure in which the nozzle 10, the main body of the movable body 20, the rotatable body 30, and the annular rack 35 are all joined or installed so as to be concentric on a plane, and as the pinion 25 engaging with the rack 35 is rotated by the driving motor 23 affixed to the movable body 20, the rotatable body 30 and components mounted thereon, such as the roller 50, are made to rotate or move along a circular arc on a plane.

The rotation direction and speed of the rotatable body 30 mounted with the roller 50 may be varied by factors such as forward rotation, reverse rotation, or an increase or decrease in the rotation speed of the driving motor 23. Such control over the driving motor 23 and the rack 35 may be automatically performed by a control panel or a computing controller connected to the driving motor 23.

Figure 7:
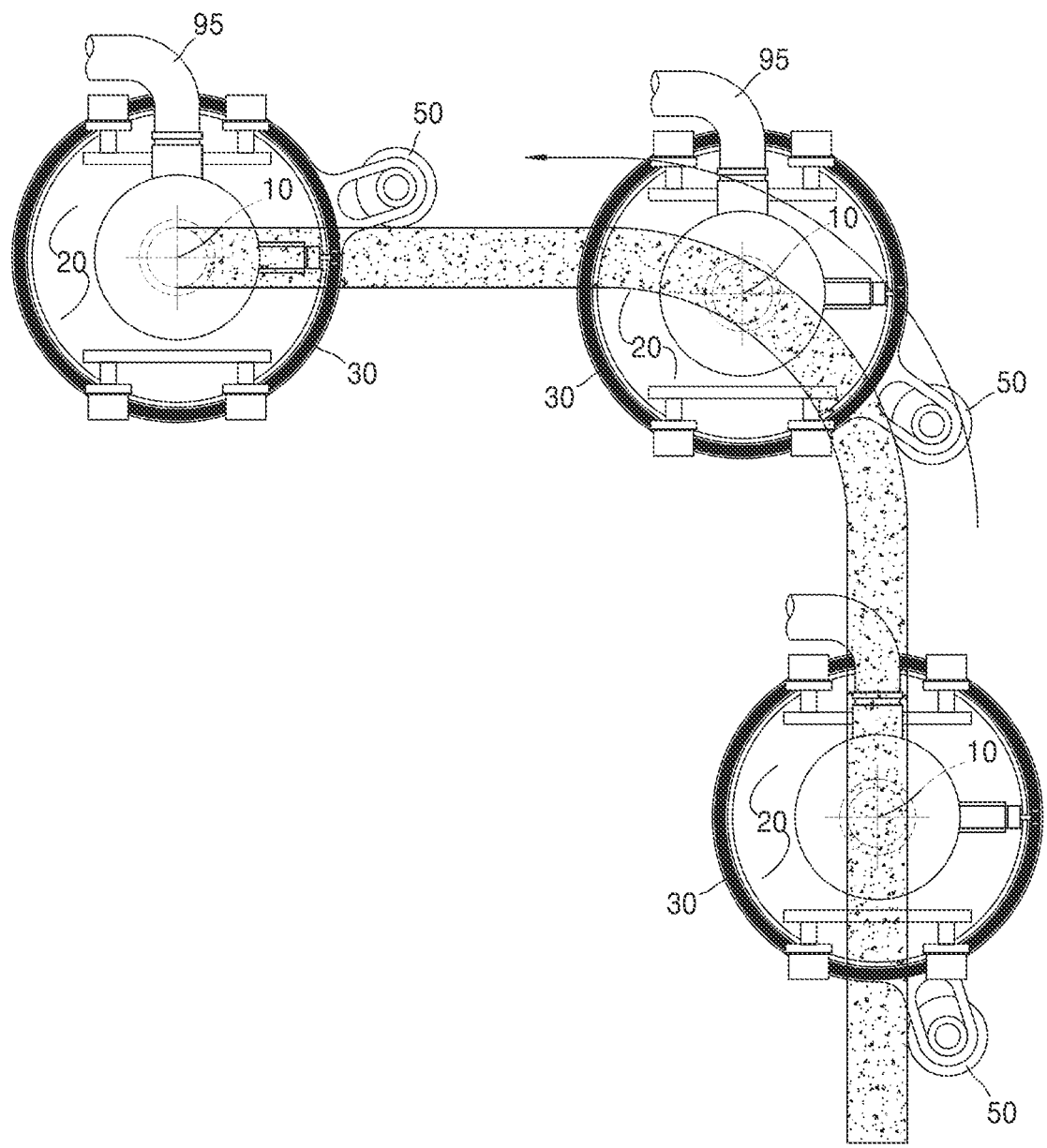
FIG. 7 is an explanatory view of an operation method of the embodiment of FIG. 2.

In particular, this planar rotating motion of the roller 50 as shown in FIG. 7 may be a useful function to allow the effect of flattening a printed object by the roller 50 to be continuous even at a planar linearly changing area of the printed object. As illustrated in the same drawing, this function may allow the roller 50 to stably be in contact with all areas including the site toward which the nozzle 10 advances (top of the drawing), the site for lateral movement of the nozzle 10 (right side of the drawing) and the curved site connecting these two sites, and then surface-flatten the areas.

Figure 8:
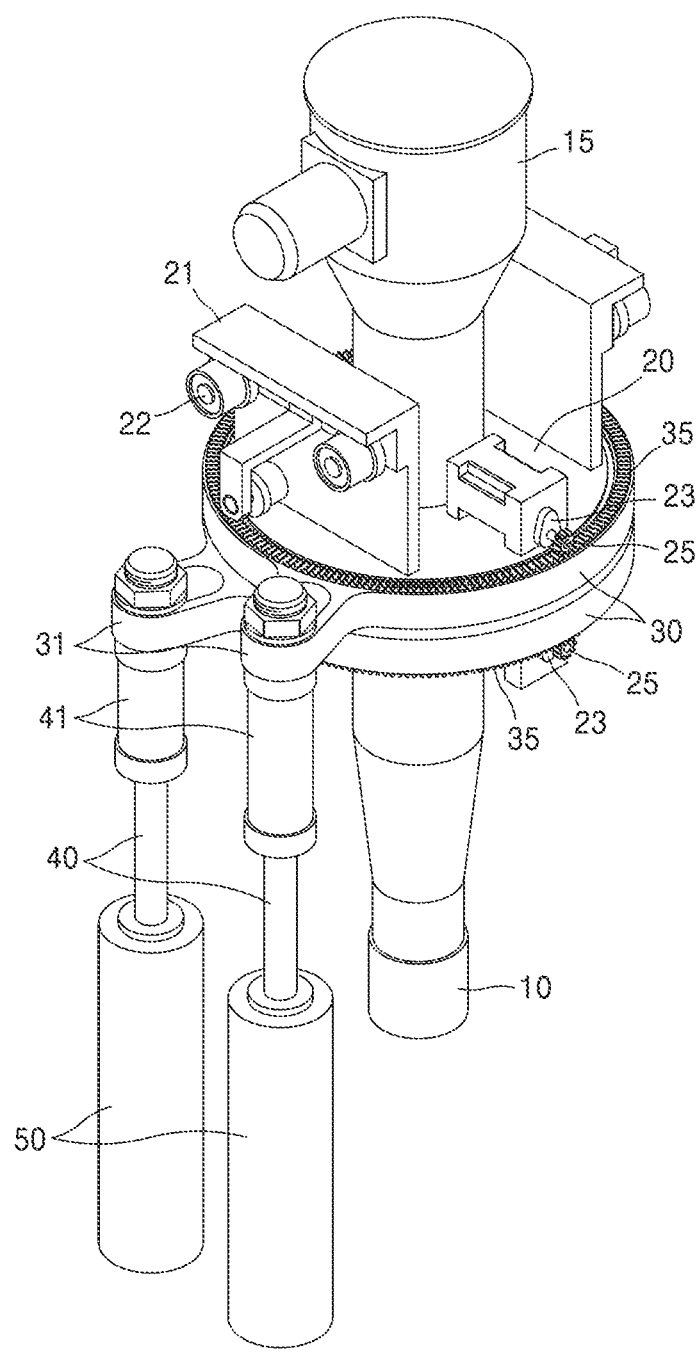
FIG. 8 is a perspective view of a main part of a double-side treatment type embodiment of the present invention.
Figure 9:
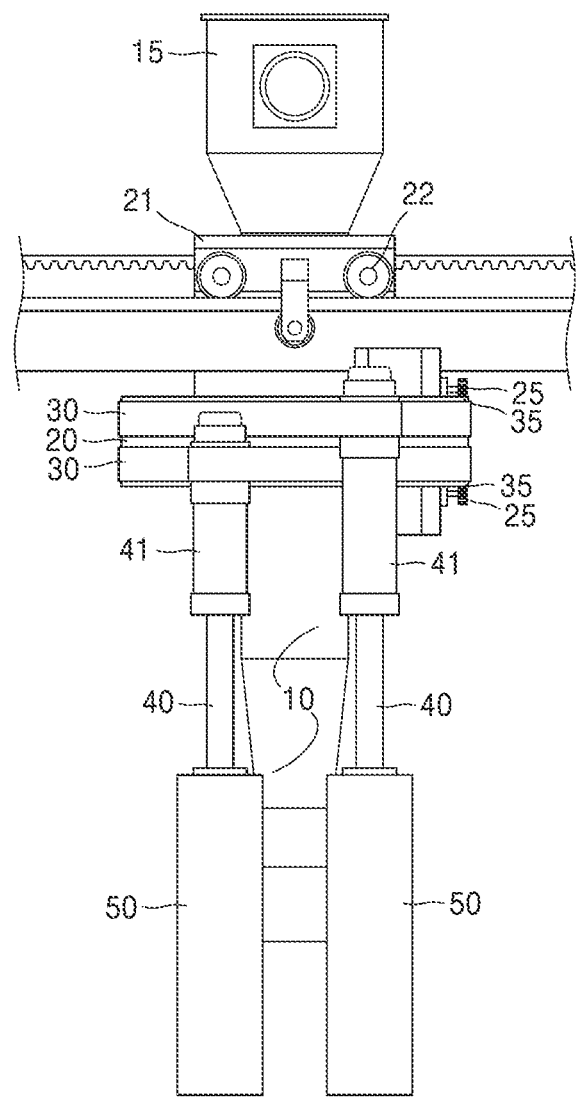
FIG. 9 is a front view of a main part of the embodiment depicted of FIG. 8.

In addition, FIG. 8 and FIG. 9 show a double-side treatment type embodiment of the present invention. In the illustrated embodiment, which shows a wall body as a printed object, a separate roller 50 is configured on each side of the printed object in-plane to be able to compress both sides of the printed wall body, wherein these rollers 50 on both sides are configured symmetrically about the central line of the printed object in-plane.

In this double-side treatment type embodiment, a rotatable body 30 on which a roller 50 is mounted may be provided for each roller 50. As shown in FIG. 9, the rotatable body 30 may be separately provided on each of an upper portion and a lower portion of a single movable body 20, wherein a rack 35, a pinion 25, and a driving motor 23 for driving a set of these two rotatable bodies 30 are also configured on each of an upper rotatable body 30 and a lower rotatable body 30.

In the embodiment illustrated in FIG. 8 and FIG. 9, the rack 35 of the upper rotatable body 30 is mounted on an upper side of the rotatable body 30, and the rack 35 of the lower rotatable body 30 is mounted on a lower side of the rotatable body 30, wherein the pinion 25 and the driving motor 23 for driving the upper rotatable body 30 are mounted on an upper side of the movable body 20, and the pinion 25 and the driving motor 23 for driving the lower rotatable body 30 are mounted on a lower side of the movable body 20, such that the upper rotatable body 30 and the lower rotatable body 30, each provided with a roller 50, are not dependent or synchronized with each other, and are operable in a completely independent manner from each other.

Figure 10:
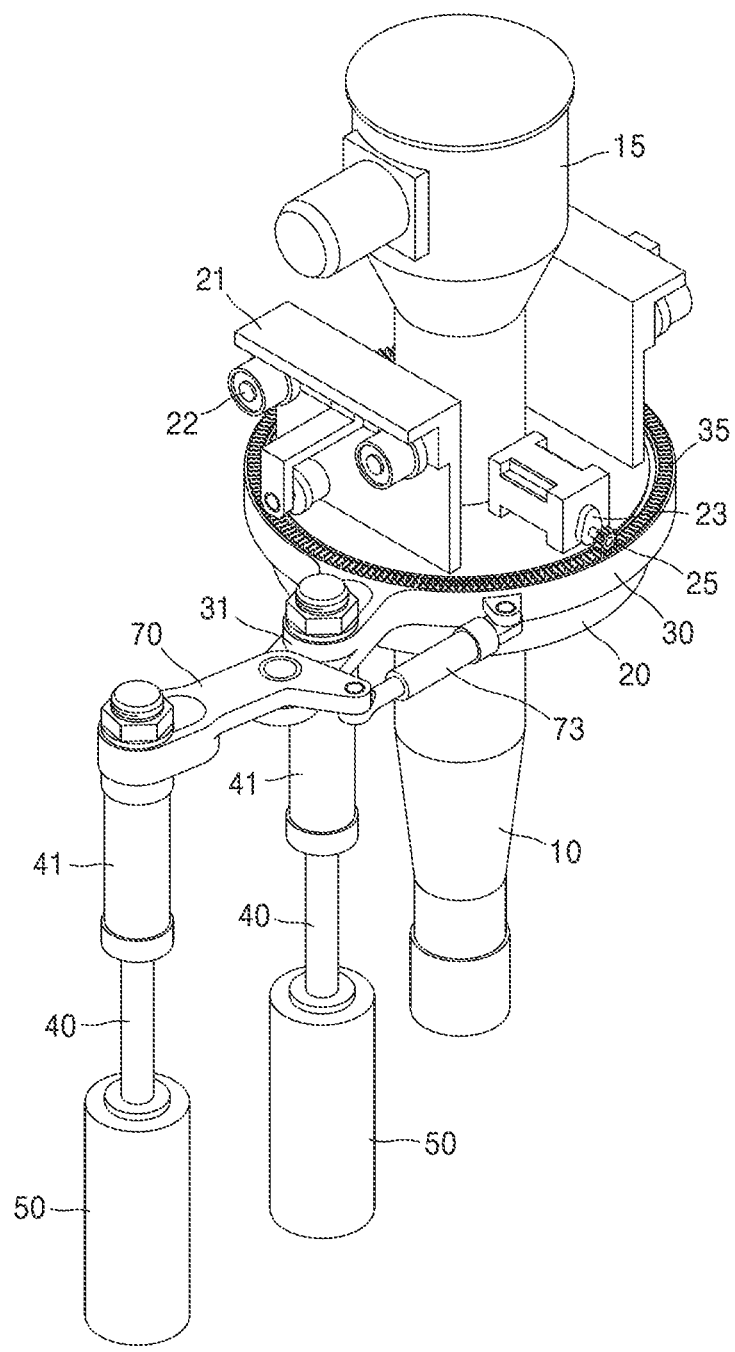
FIG. 10 is a perspective view of a main part of a multi-treatment type embodiment of the present invention.
Figure 11:
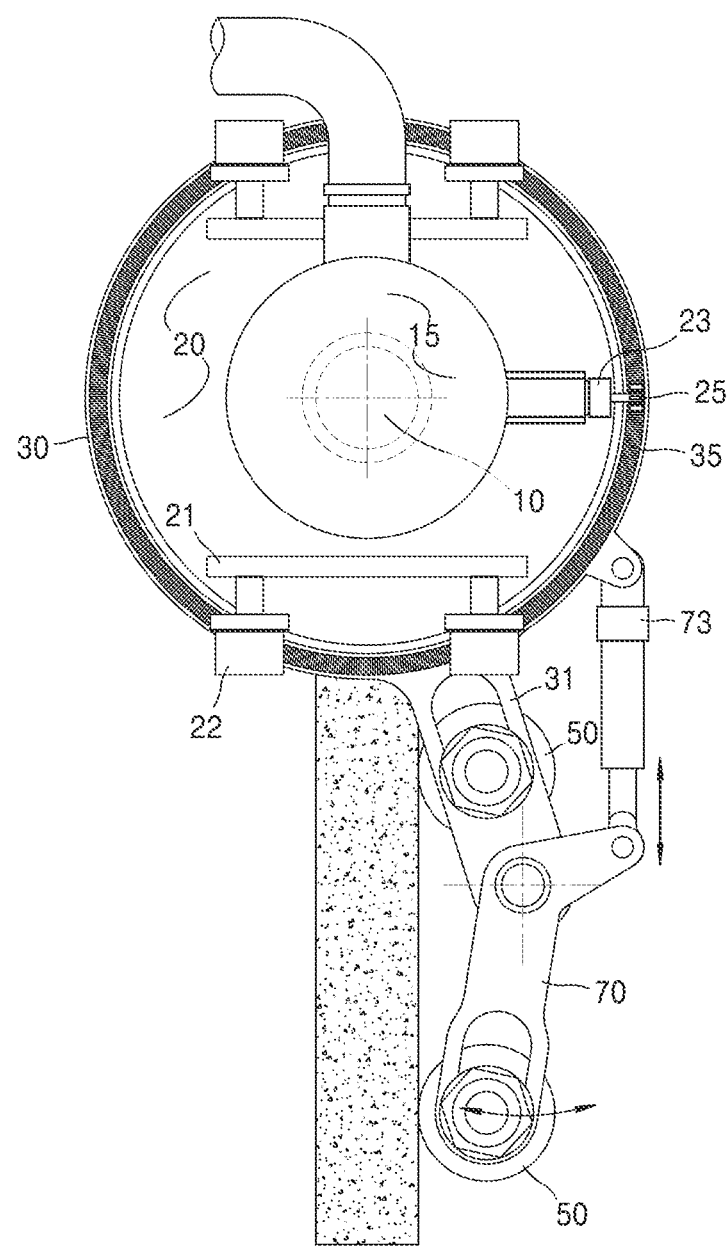
FIG. 11 is a diagram showing an operating method of the embodiment of FIG. 10.

Illustrated in FIG. 10 and FIG. 11 is a multi-treatment type embodiment in which flattening of a printed object by roller 50 is carried out, not by a temporary roller 50 contact by a single roller 50 for each surface of the printed object, but by means of an additional contact roller 50 that follows an initial contact roller 50.

In particular, as shown in FIG. 10 and FIG. 11, a rotatable plate 70 may be connected to the rotatable body 30, a support shaft 40 of a roller 50 being installed at one end of the rotatable plate 70, wherein the inside of the planar rotatable plate 70 is hinged to the rotatable body 30, and the other end of the rotatable plate 70 may be connected to the rotatable body 30 via an elastic body 73, such that as the elastic body 73 is stretched or contracted, the rotatable plate 70 rotates on a plane.

In the illustrated embodiment, the planar rotatable plate 70 is a plate body having a bent central portion, and by a hinge configured in the central portion, the rotatable body 30 and the rotatable plate 70 are connected to each other in a freely rotatable manner with respect to a hinge axis parallel to the nozzle 10.

In addition, as shown in FIG. 11, between the other end of the rotatable plate 70 opposite to one end thereof mounted with a roller 50, and a peripheral portion of the rotatable body 30, an elastic body 73 may be provided such that as the elastic body 73 is stretched or contracted, the rotatable plate 70 rotates so that the angle of the planar rotatable plate 70 may be changed.

The elastic body 73 for connecting the rotatable plate 70 and the rotatable body 30 may utilize an axial changing or moving device, such as a fluid pressure cylinder, and the distance between the outer circumferential surface of the spray pipe 60 mounted in the rotatable plate 70 and the central line of the printed object may be adjusted by varying the plane angle of the rotatable plate 70.

Accordingly, via components related to the rotatable plate 70, stable movement of a following roller 50 around a linearly changing section of a printed object may be made possible, and also the distance between the printed object and the following roller 50 may be set to become smaller than the distance between the printed object and a preceding roller 50 as needed to thereby enable a treatment such as an additional compression of the printed object.

Figure 12:
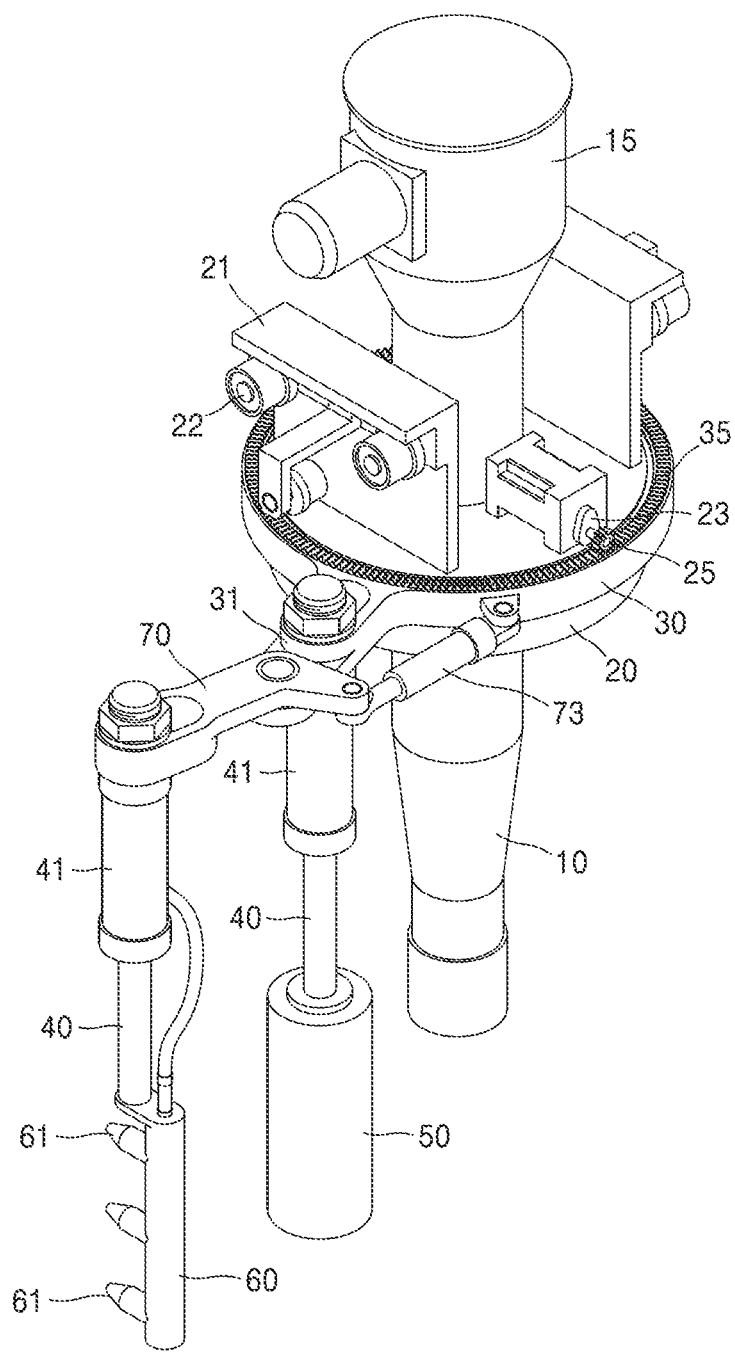
FIG. 12 is a perspective diagram of a main part of a composite-treatment type embodiment of the present invention.

FIG. 12 shows an application of the rotatable plate 70—related components described above to allow spraying of a liquid material as a treatment following the preceding roller 50 instead of compression by the roller 50. Here, the liquid material sprayed to a printed object may include various coating liquids, reinforcing chemicals, and the like, as well as water for wetting the surface of the printed object.

That is, as shown FIG. 12, a planar rotatable plate 70 is connected to a rotatable body 30, wherein a spray pipe 60 is connected to one end of the rotatable plate 70, wherein the inside of the planar rotatable plate 70 is hinged to the rotatable body 30 and the other end of the rotatable plate 70 is connected to the rotatable body 30 via an elastic body 73, such that as the elastic body 73 is stretched or contracted, the rotatable plate 70 rotates on a plane. Here, the basic operation method such as rotation operation of the rotatable plate 70 and direction control of the spray pipe 60 are the same as described with respect to the embodiment in FIG. 10 and FIG. 11 above.

However, in the embodiment illustrated in FIG. 12, the spray pipe 60 includes spray holes 61 facing the printed object to spray a liquid material to the surface of the printed object, thereby enabling a complex treatment such as forming a coating layer on the surface of the printed object, preventing excessive drying and maintaining an appropriate wet state on the surface of the printed object, and the like.

Figure 13:
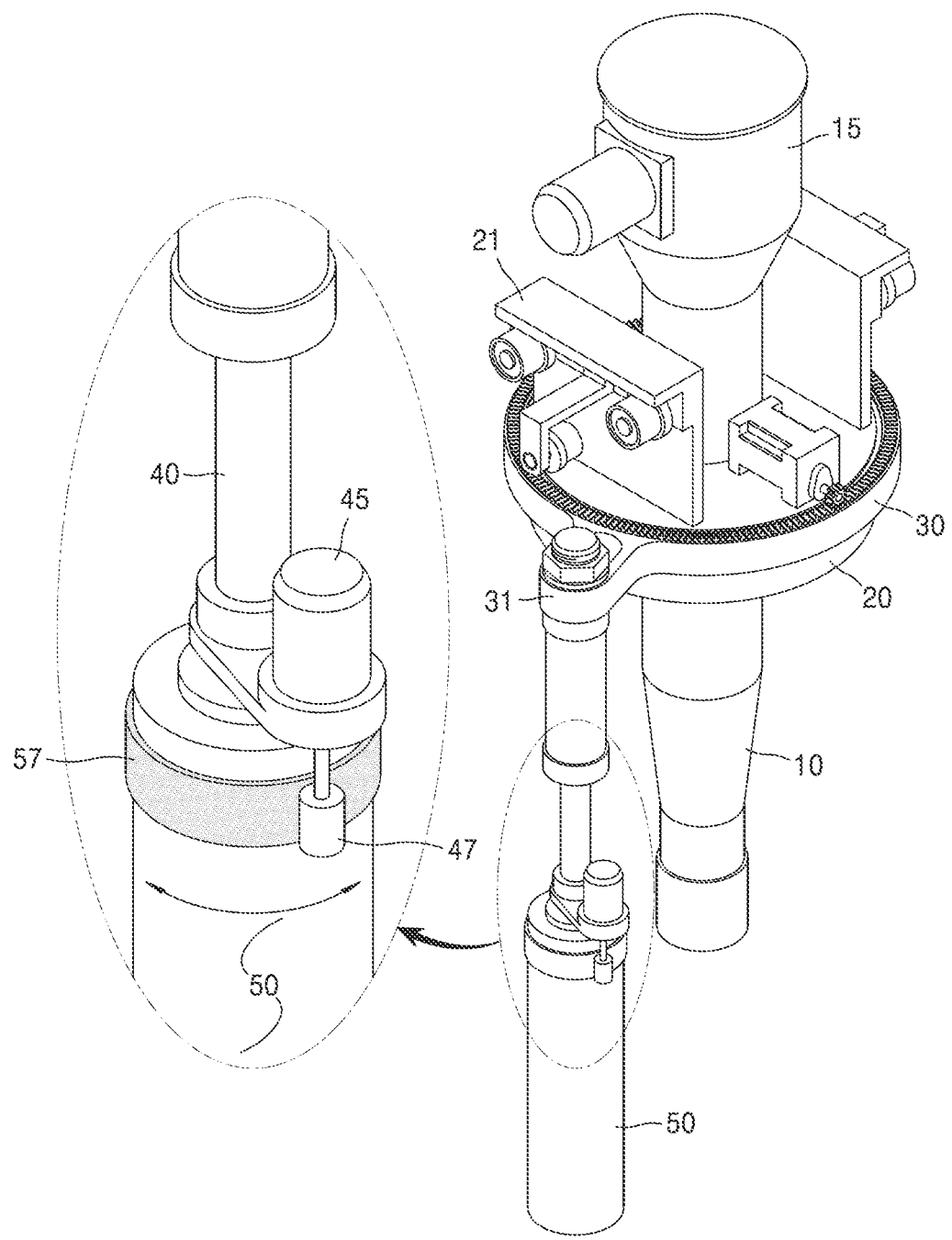
FIG. 13 is a perspective view of a main part of a self-rotating roller-type embodiment of the present invention.

Meanwhile, illustrated in FIG. 13 is an self-rotation type embodiment of a roller 50 of the present invention, wherein a driving part 45 rotating a driving wheel 47 is mounted on a support shaft 40 to which the roller 50 is connected, and a driven wheel 57 being in contact with the driving wheel 47 is mounted on the roller 50, such that the driving part 45 rotates, the driven wheel 57 and the roller 50 are forced to rotate.

Here, the driving part 45 is a power source e.g., a motor for rotating the driving wheel 47, and the driving wheel 47 and the driven wheel 57 are a power transmission means for transmitting a rotational force of the driving part 45 to the roller 50.

Free rotation of the roller 50 is also possible in the embodiments of FIGS. 4 to 12 described above. In this case, while the support shaft 40 is fixed, the roller 50 connected to a lower end of the support shaft 40 in a freely rotatable manner may be rotated by contact with the printed object.

That is, movement of the movable body 20 while the freely-rotatable roller 50 is in contact with the printed object causes the roller 50 to rotate along the surface of the printed object. Here, since the rotational force of the roller 50 is derived from the force of friction with the printed object, a shear stress by friction of the roller 50 is inevitably generated on the surface portion of the printed object.

This generation of a shear stress on the surface portion of the printed object, when its intensity maintains at an appropriate level, may give rise to a beneficial effect such as densification of tissues. However, generation of excessive shear stress may cause adverse side effects, such as immediate damage to the corresponding site, generation of a residual stress after curing, and the like.

To this end, to maintain an appropriate level of generation of frictional force between the roller 50 and the printed object during contact-movement of the roller 50, the roller 50 may be forced into self-rotation by means of the driving part 45 and the driven wheel 57, thereby preventing the above-mentioned damage to the printed object and the like.

The invention claimed is:

1. A printed object surface-flattening type 3D printer for construction, wherein a roller (50) mounted on a movable body (20), and configured to follow a nozzle (10) discharging a fluid material and parallel to the discharge direction of the fluid material is installed, wherein a rotatable body (30) is installed on the movable body (20), the rotatable body (30) having an axis of rotation parallel to a discharge direction of the nozzle (10), and a support shaft (40) of the roller (50) is connected to the rotatable body (30), such that as the rotatable body (30) rotates, the support shaft (40) and the roller (50) move along a circular arch centered on the axis of rotation, wherein the roller (50) moves along with movement of the movable body (20) and the nozzle (10); and an outer circumferential surface of the roller (50) is in contact with a surface of a printed object extruded from the nozzle (10) to thereby flatten the surface of the printed object, wherein a planar rotatable plate (70) is connected to the rotatable body (30), wherein the inside of the planar rotatable plate (70) is hinged to the rotatable body (30); and one end of the planar rotatable plate (70) is connected to the rotatable body (30) via an elastic body (73), such that as the elastic body (73) is stretched or contracted, the planar rotatable plate (70) rotates on a plane.

2. The 3D printer for construction of claim 1, wherein the support shaft (40) of the roller (50) is connected to the other end of the planar rotatable plate (70).

3. The 3D printer for construction of claim 1, wherein a spray pipe (60) is connected to the other end of the planar rotatable plate (70); and a spray hole (61) is formed in the spray pipe (60), the spray hole (61) facing a printed object to thereby spray a liquid material onto the surface of the printed object.

4. The 3D printer for construction of claim 1, wherein an annular rack (35) is mounted on the rotatable body (30), a planar center of the annular rack (35) coinciding with the axis of rotation of the rotatable body (30); and a pinion (25) is installed on the movable body (20), the pinion (25) being connected to a driving motor (23) and engaged with the rack (35), such that as the pinion (25) rotates, the rack (35) and the rotatable body (30) rotate.

\* \* \* \* \*